United States Patent
Oda et al.

(10) Patent No.: US 8,391,725 B2
(45) Date of Patent: Mar. 5, 2013

(54) OPTICAL RECEIVER FOR CONTROLLING WAVELENGTH OF LOCAL OSCILLATION LIGHT AND LOCAL OSCILLATION LIGHT CONTROL METHOD

(75) Inventors: Shoichiro Oda, Kawasaki (JP); Takeshi Hoshida, Kawasaki (JP); Hisao Nakashima, Kawasaki (JP); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 726 days.

(21) Appl. No.: 12/496,274

(22) Filed: Jul. 1, 2009

(65) Prior Publication Data

US 2010/0111544 A1 May 6, 2010

(30) Foreign Application Priority Data

Oct. 31, 2008 (JP) ................................ 2008-281532

(51) Int. Cl.
*H04B 10/06* (2006.01)
(52) U.S. Cl. ....................................... 398/204; 398/202
(58) Field of Classification Search ................... 398/204
See application file for complete search history.

(56) References Cited

U.S. PATENT DOCUMENTS

| | | | | |
|---|---|---|---|---|
| 4,903,328 A * | 2/1990 | Ichikawa | .................... | 455/165.1 |
| 4,912,527 A * | 3/1990 | Yamazaki | ...................... | 398/204 |
| 5,144,467 A * | 9/1992 | Kitajima et al. | ................ | 398/95 |
| 5,400,167 A * | 3/1995 | Suemura | ........................ | 398/209 |
| 5,471,336 A * | 11/1995 | Onaka et al. | .................. | 398/204 |
| 5,515,197 A * | 5/1996 | Hooijmans et al. | ........... | 398/202 |
| 5,757,531 A * | 5/1998 | Tomesen et al. | .............. | 398/204 |
| 7,406,269 B2 * | 7/2008 | Becker et al. | ................. | 398/206 |
| 7,865,086 B2 * | 1/2011 | Tomaru | ......................... | 398/204 |
| 8,005,368 B2 * | 8/2011 | Roberts et al. | ................ | 398/150 |
| 8,073,344 B2 * | 12/2011 | Pruszenski | .................... | 398/203 |
| 8,249,464 B2 * | 8/2012 | Oda et al. | ...................... | 398/162 |
| 2002/0018271 A1 * | 2/2002 | Takeuchi | ....................... | 359/187 |
| 2007/0036555 A1 | 2/2007 | Chen et al. | | |
| 2008/0145066 A1 * | 6/2008 | Hoshida | ........................ | 398/205 |
| 2008/0205905 A1 | 8/2008 | Tao et al. | | |
| 2009/0269082 A1 * | 10/2009 | Pruszenski | .................... | 398/204 |
| 2010/0254718 A1 * | 10/2010 | Oda et al. | ...................... | 398/202 |
| 2012/0148235 A1 * | 6/2012 | Nishihara et al. | ............... | 398/29 |
| 2012/0212800 A1 * | 8/2012 | Nakata | ..................... | 359/337.11 |

FOREIGN PATENT DOCUMENTS

| | | |
|---|---|---|
| JP | 4-252527 | 9/1992 |
| JP | 5-48540 | 2/1993 |
| JP | 2008-211801 | 9/2008 |
| JP | 2009-505571 | 2/2009 |
| WO | 2007/021569 | 2/2007 |

OTHER PUBLICATIONS

Japanese Office Action issued Oct. 23, 2012 in corresponding Japanese Patent Application No. 2008-281532.

* cited by examiner

*Primary Examiner* — Kenneth N Vanderpuye
*Assistant Examiner* — Amritbir Sandhu
(74) *Attorney, Agent, or Firm* — Staas & Halsey LLP

(57) ABSTRACT

While altering a plurality of wavelength setting parameters according to a control sequence, a local oscillation light having a wavelength controlled by those wavelength setting parameters is generated. Further, the received signal light and the generated local oscillation light are mixed, and if an electric signal is generated by photoelectric conversion from the resulting light, then the wavelength control of the local oscillation light is terminated.

10 Claims, 20 Drawing Sheets

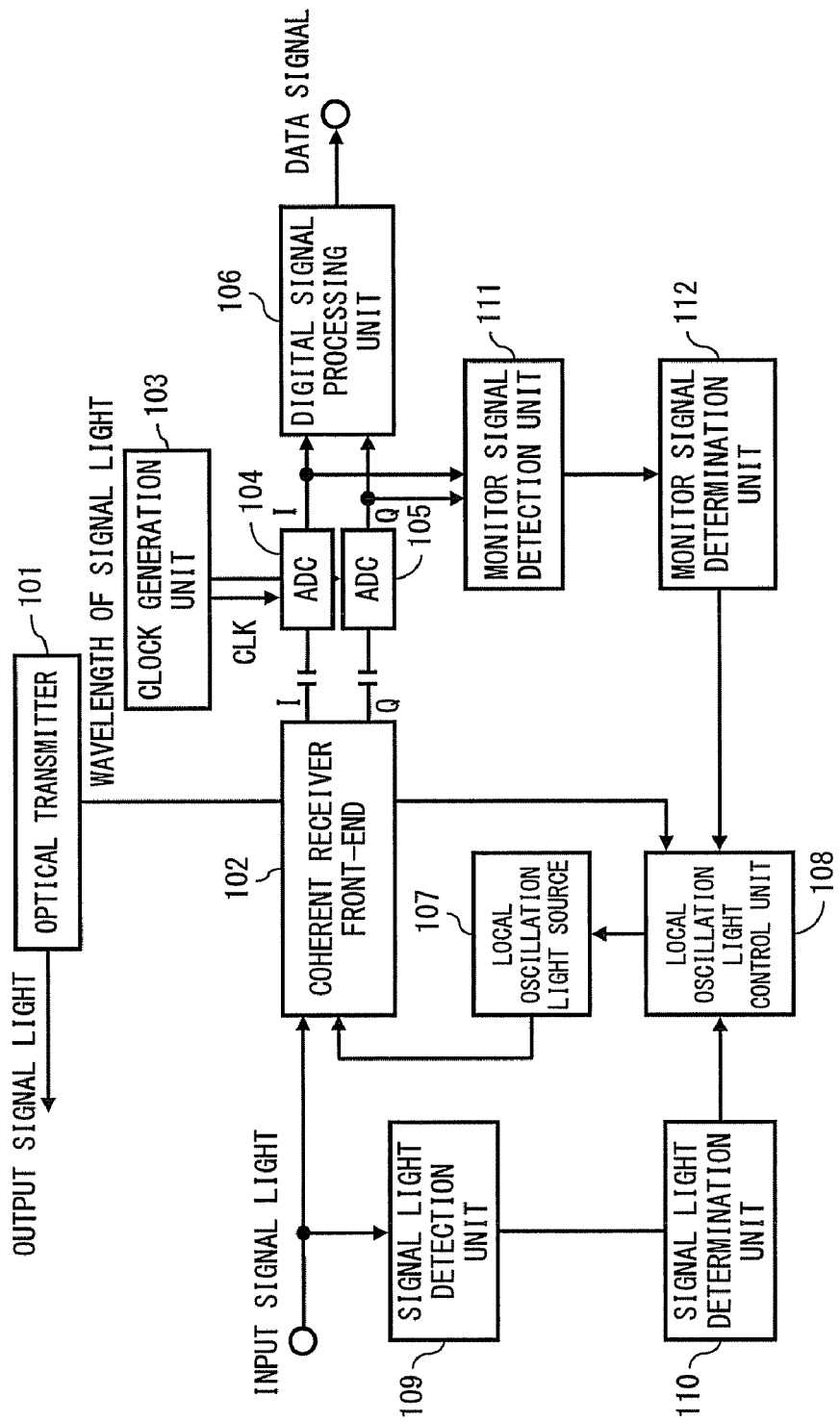
F I G. 1

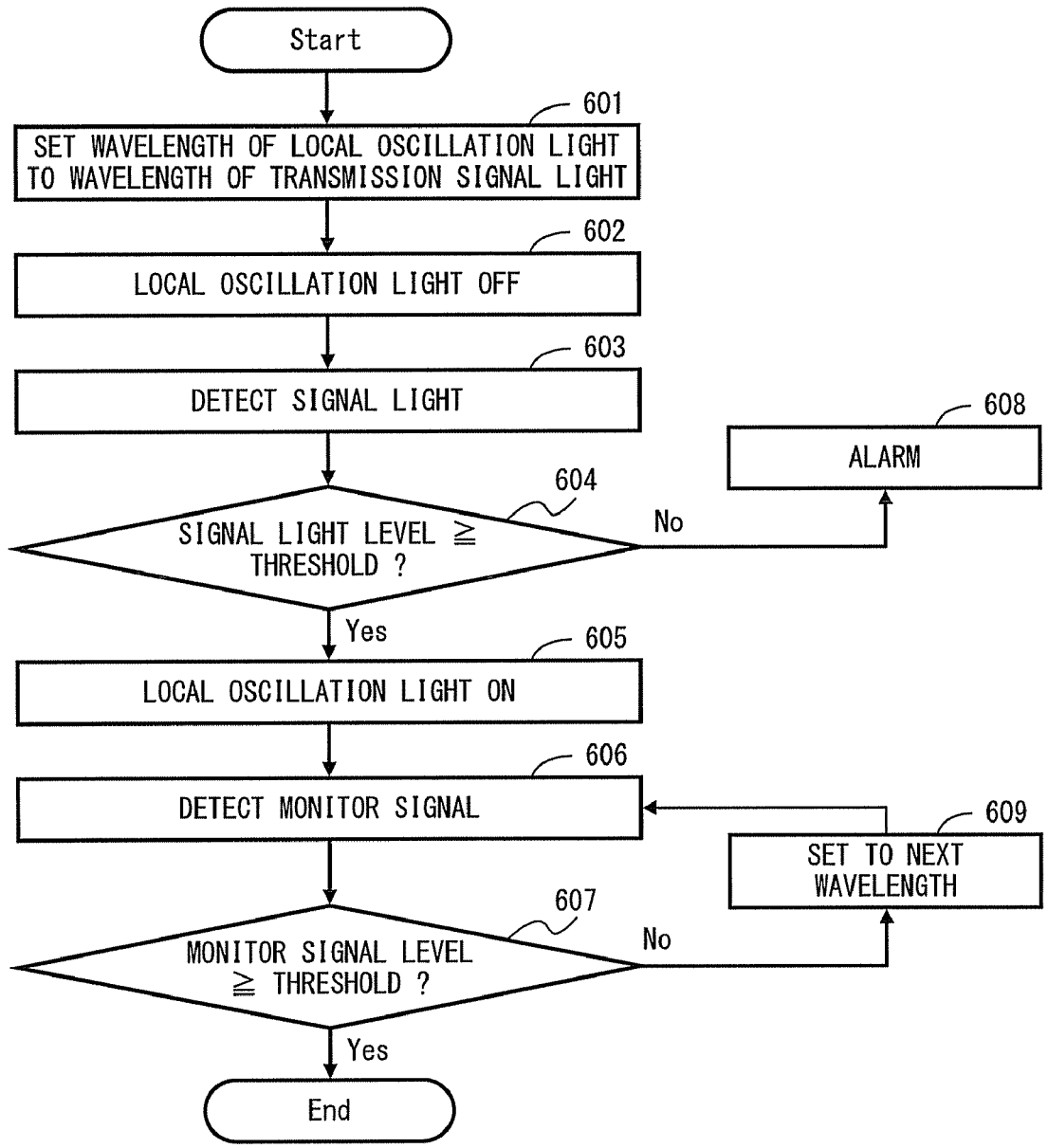
F I G. 6

|  | SWITCHING TIME | NUMBER OF SWITCHING STEPS |
|---|---|---|
| TEMPERATURE REGULATION | 1 [s] | 5 |
| CURRENT REGULATION | 10 [ms] | 5 |

F I G. 7

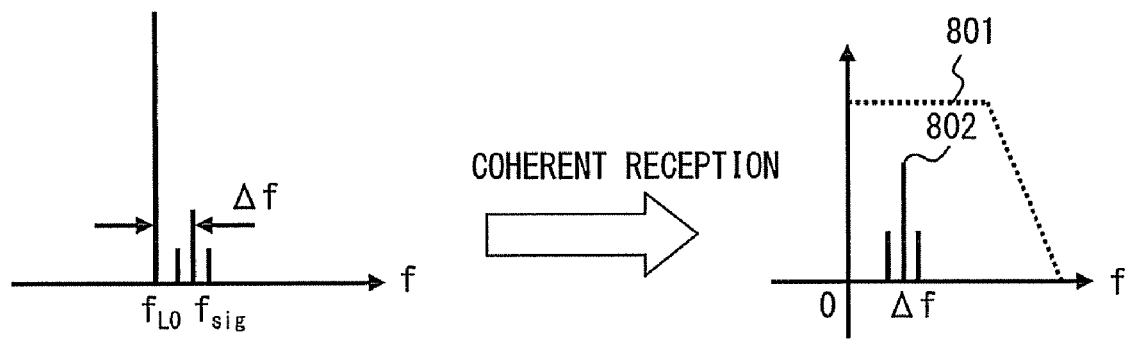
F I G. 8

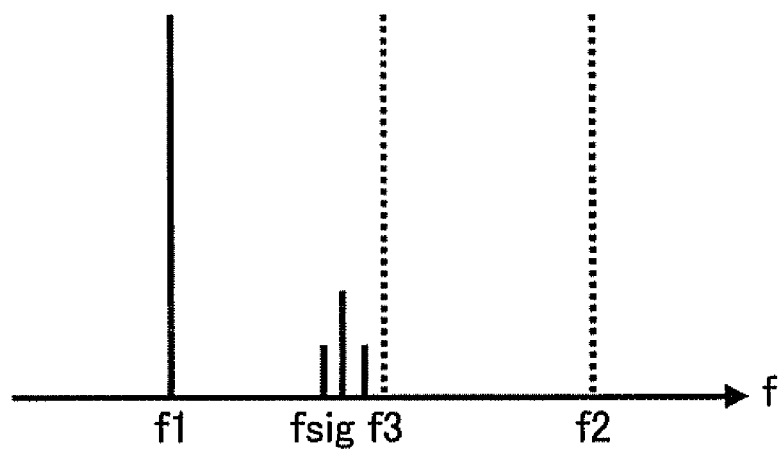
F I G. 1 0

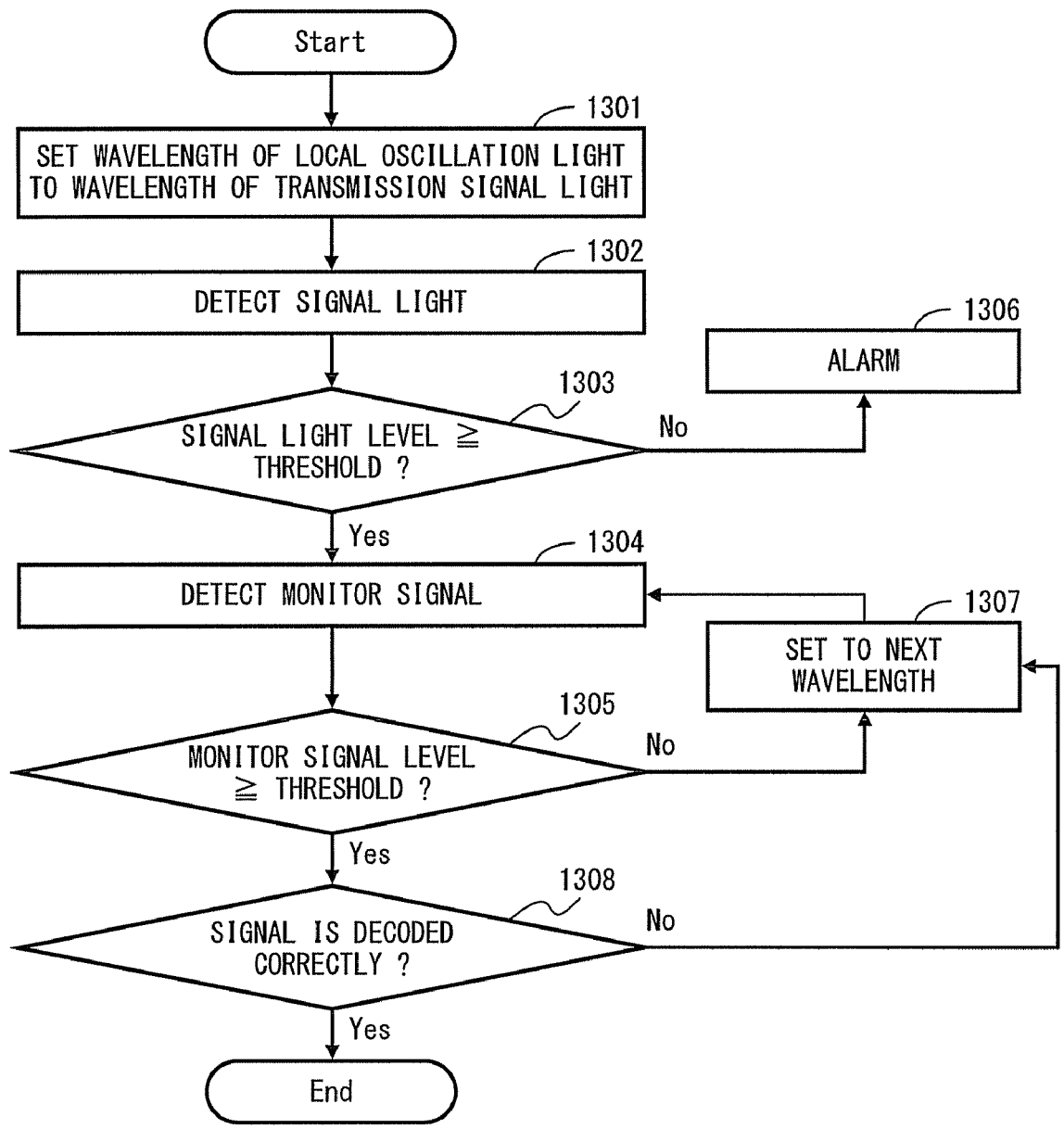
F I G. 13

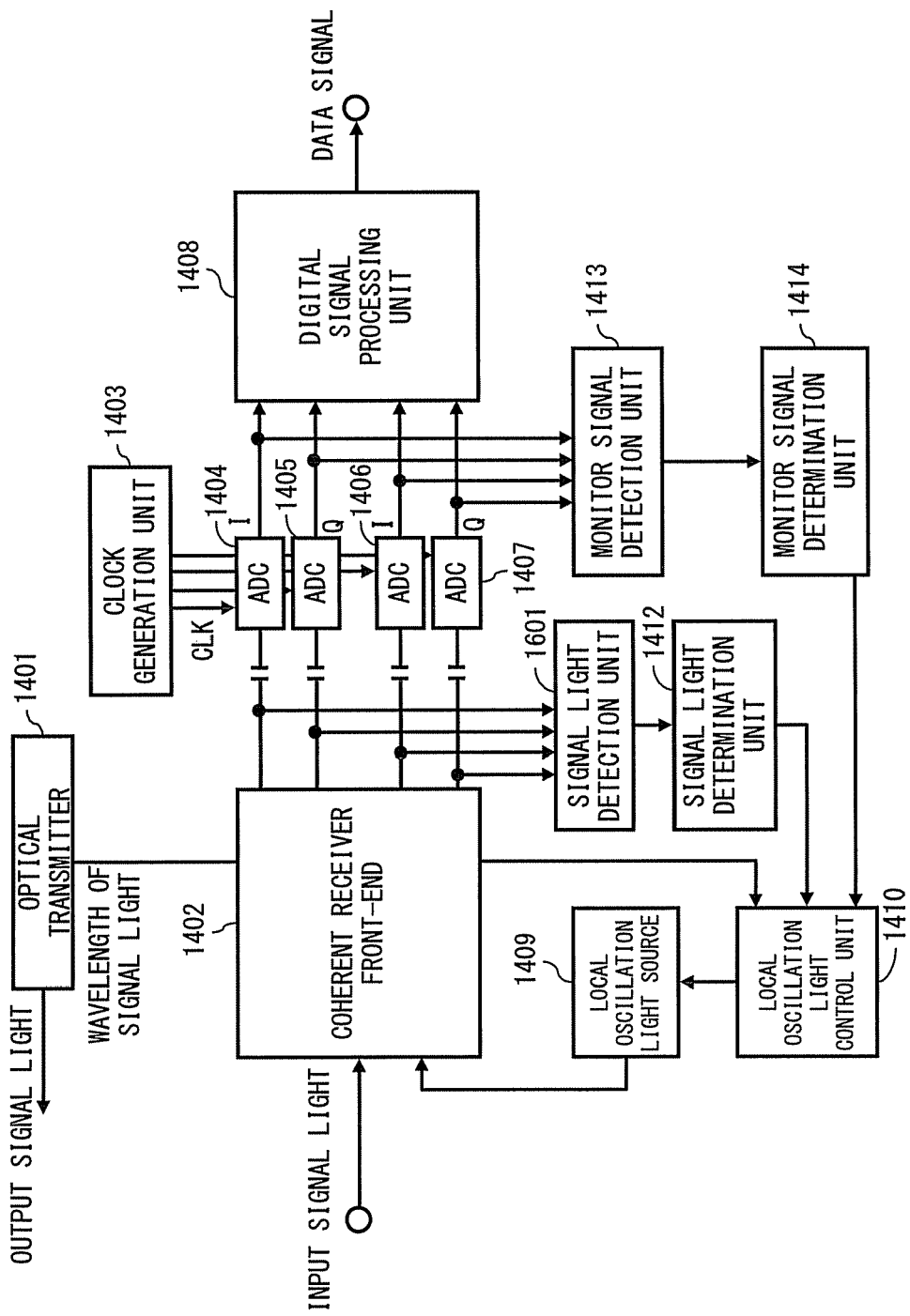
F I G. 16

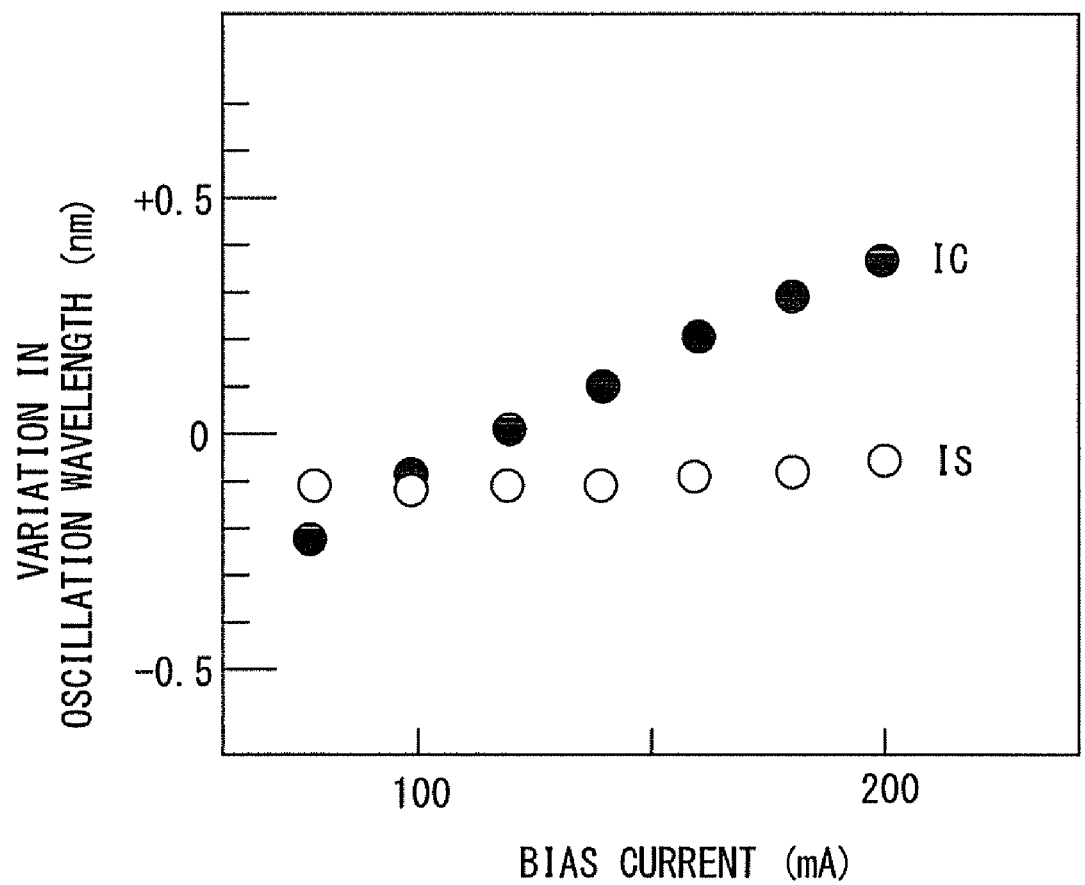
F I G. 18

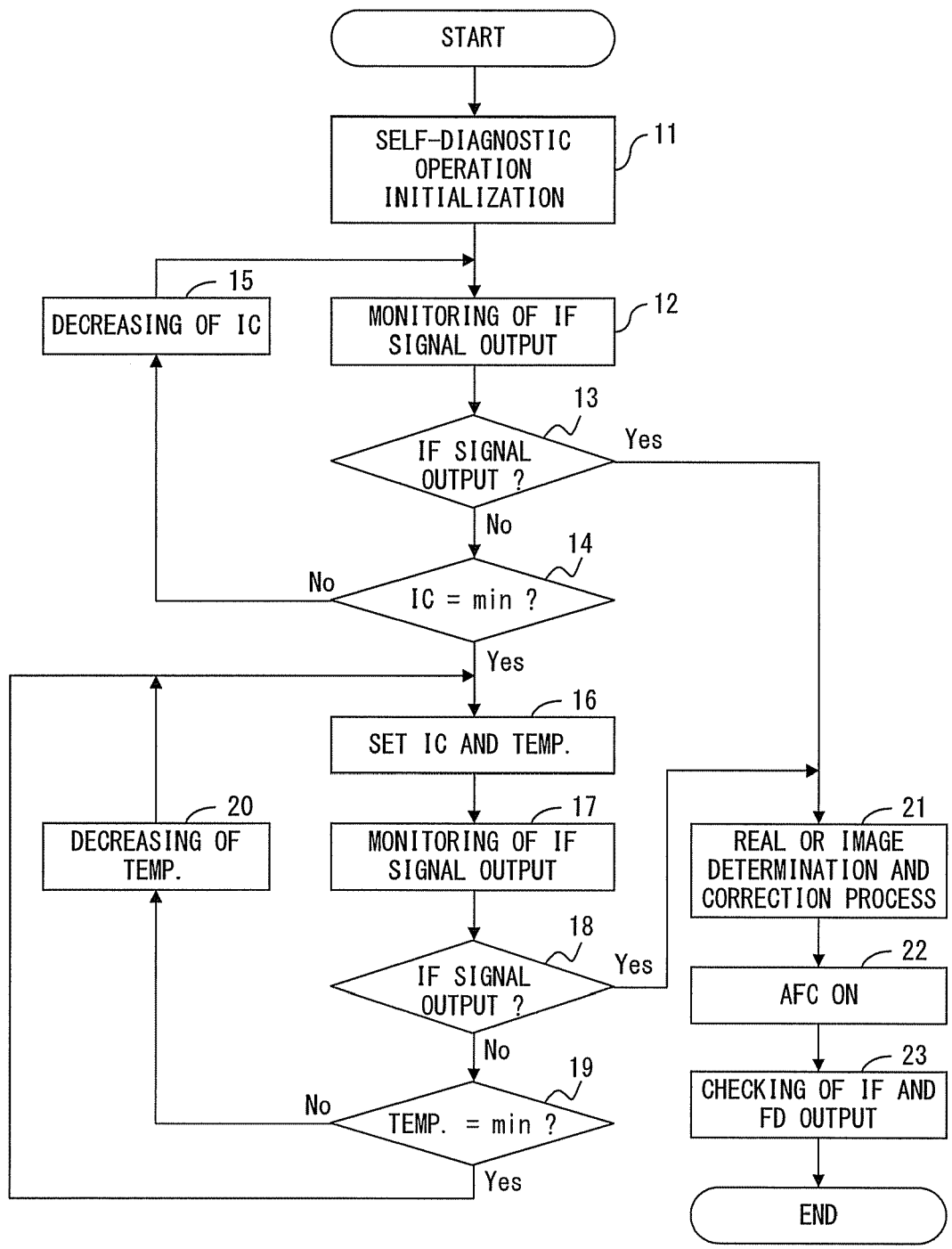
F I G. 19

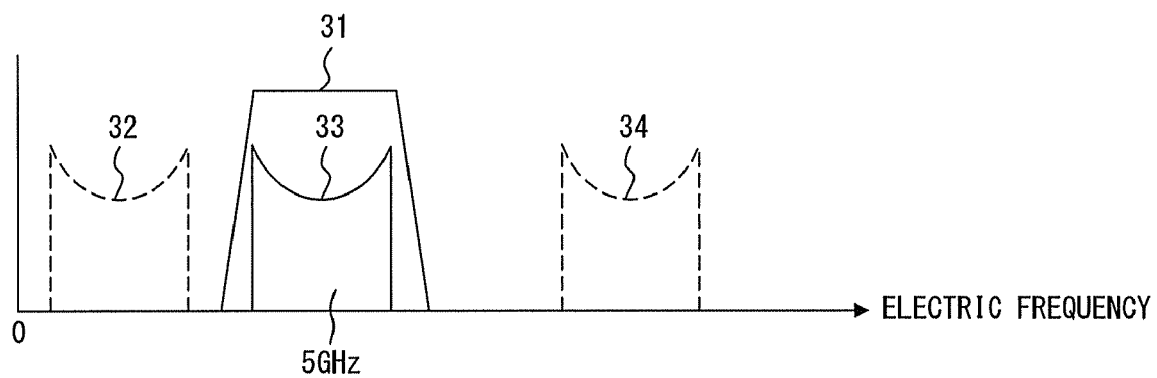
F I G. 2 0

OPTICAL RECEIVER FOR CONTROLLING WAVELENGTH OF LOCAL OSCILLATION LIGHT AND LOCAL OSCILLATION LIGHT CONTROL METHOD

CROSS-REFERENCE TO RELATED APPLICATIONS

This application is based upon and claims the benefit of priority of the prior Japanese Patent Application No. 2008-281532, filed on Oct. 31, 2008, the entire contents of which are incorporated herein by reference.

FIELD

The embodiments discussed herein are related to an optical receiver for controlling the wavelength of local oscillation light and a local oscillation light control method.

BACKGROUND

Currently, research and development of digital coherent optical receivers are being promoted, and it is expected to achieve a significant reduction in the device cost of light communication systems. In a digital coherent optical receiver, a signal is decoded by mixing a received signal light and a local oscillation light.

On the other hand, in a conventional heterodyne optical receiver, automatic frequency control (AFC) is executed so that a center frequency of an intermediate-frequency (IF) signal obtained by mixing a signal light and a local oscillation light is kept constant. Therefore, an automatic starting method to bring a signal band of the IF signal into the capture range of an AFC is proposed.

In this automatic starting method, the wavelength of local oscillation light is swept by increasing or decreasing an electric current or a temperature applied to a laser diode (LD) used as a local oscillation light source.

FIG. 18 illustrates the relationship between the variation in oscillation wavelength and the bias current in a three-electrode distributed-feedback LD. The variation in oscillation wavelength against the change in the current IC supplied to the center electrode is greater than the variation in oscillation wavelength against the change in the current IS supplied to the side electrode by approximately one order of magnitude, thereby the wavelength of local oscillation light can be swept by controlling the current IC.

FIG. 19 is a flowchart of the automatic starting method in a heterodyne optical receiver including such an LD. First, the optical receiver performs a self-diagnostic operation, and at the same time, sets initial values of the current IC and the temperature (step 11). Subsequently, monitoring of the IF signal output is performed (step 12), and it is determined whether or not the IF signal output is present (step 13).

If the IF signal output is not present (No in step 13), whether or not the current IC is at its minimum is checked (step 14), and if the current IC is not at the minimum, then the current IC is decreased by a predetermined value (step 15), and thereafter, controls in step 12 and after are repeated.

On the other hand, if the current IC is at the minimum (Yes in step 14), the current IC is left at the minimum, and at the same time the temperature is set to its maximum (step 16). Subsequently, monitoring of the IF signal output is performed (step 17), and it is determined whether or not the IF signal output is present (step 18). If the IF signal output is not present (No in step 18), it is checked whether or not the temperature is at its minimum (step 19). If the temperature is not at the minimum (No in step 19), then the temperature is decreased by a predetermined value (step 20), and thereafter, controls in step 17 and after are repeated.

On the other hand, if the temperature is at the minimum in step 19 (Yes in step 19), the current IC and the temperature are set to their maximums (step 16), and thereafter, controls in step 17 and after are repeated.

If the IF signal output is present in step 13 or 18 (Yes in step 13 or 18), it is determined whether the frequency of the signal light or the frequency of the local oscillation light is higher on the basis of whether the IF signal is on the real side or on the image side (step 21).

If the frequency of signal light is higher than the frequency of local oscillation light, AFC is turned on without change (step 22), the IF signal output and the frequency discriminator (FD) output are checked (step 23), and then control is terminated. On the other hand, if the frequency of signal light is lower than the frequency of local oscillation light in step 21, controls in step 22 and after are performed after the frequency of local oscillation light is modified. Thereby the IF signal can be brought into the capture range of AFC.

FIG. 20 illustrates the detectable range of the IF signal. Since the IF signal passes through a band pass filter, the IF signal can be detected only when its frequency is within the pass band 31 of the band pass filter. Therefore, the IF signal 33 within the pass band 31 will be detected, while a signal having a signal band outside of the pass band 31, such as the IF signal 32 or 34, will not be detected in for example the initial state of the automatic starting method.

Patent Document 1: Japanese Laid-open Patent Publication No. 05-48540

SUMMARY

According to an aspect of the embodiment, an optical receiver includes a local oscillation light source, a receiving device, a signal processing device, a signal determination device, and a local oscillation light control device.

The local oscillation light source outputs a local oscillation light having a wavelength determined on the basis of a plurality of wavelength setting parameters. The receiving device generates an electric signal by photoelectric conversion from a light obtained by mixing a received signal light and the local oscillation light. The signal processing device decodes a received signal on the basis of the electric signal. The signal determination device determines whether or not the electric signal is output from the receiving device.

The local oscillation light control device controls the wavelength of the local oscillation light output from the local oscillation light source by altering the wavelength setting parameters according to a parameter control sequence determined for the plurality of wavelength setting parameters. Further, the local oscillation light control device terminates wavelength control of the local oscillation light when it is determined that the electric signal is output from the receiving device.

According to another aspect of the embodiment, a local oscillation light source device includes a local oscillation light source and a local oscillation light control device.

The local oscillation light source outputs a local oscillation light having a wavelength determined on the basis of a plurality of wavelength setting parameters. The local oscillation light control device controls the wavelength of the local oscillation light output from the local oscillation light source by altering the wavelength setting parameters according to a parameter control sequence determined for the plurality of wavelength parameters. Further, the local oscillation light control device terminates wavelength control of the local oscillation light when it is determined that an electric signal is generated by photoelectric conversion from a light obtained by mixing a received signal light and the local oscillation light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram of the first single-polarization digital coherent optical receiver;

FIG. 6 is a flowchart of the second wavelength control;

FIG. 7 is a diagram illustrating an example of wavelength setting parameters of the local oscillation light source;

FIG. 8 is a diagram illustrating the case wherein the frequency of signal light is generally consistent with the frequency of local oscillation light;

FIG. 10 is a diagram of the first malfunction;

FIG. 13 is a flowchart of wavelength control applying the second method of preventing malfunction;

FIG. 16 is a configuration diagram of the third dual-polarization digital coherent optical receiver;

FIG. 18 is a diagram illustrating the relationship between the variation in oscillation wavelength and the bias current in LD;

FIG. 19 is a flowchart of an automatic starting method in a conventional heterodyne optical receiver; and FIG. 20 is a diagram illustrating a detectable range of an IF signal.

DESCRIPTION OF EMBODIMENTS

Figure 2:
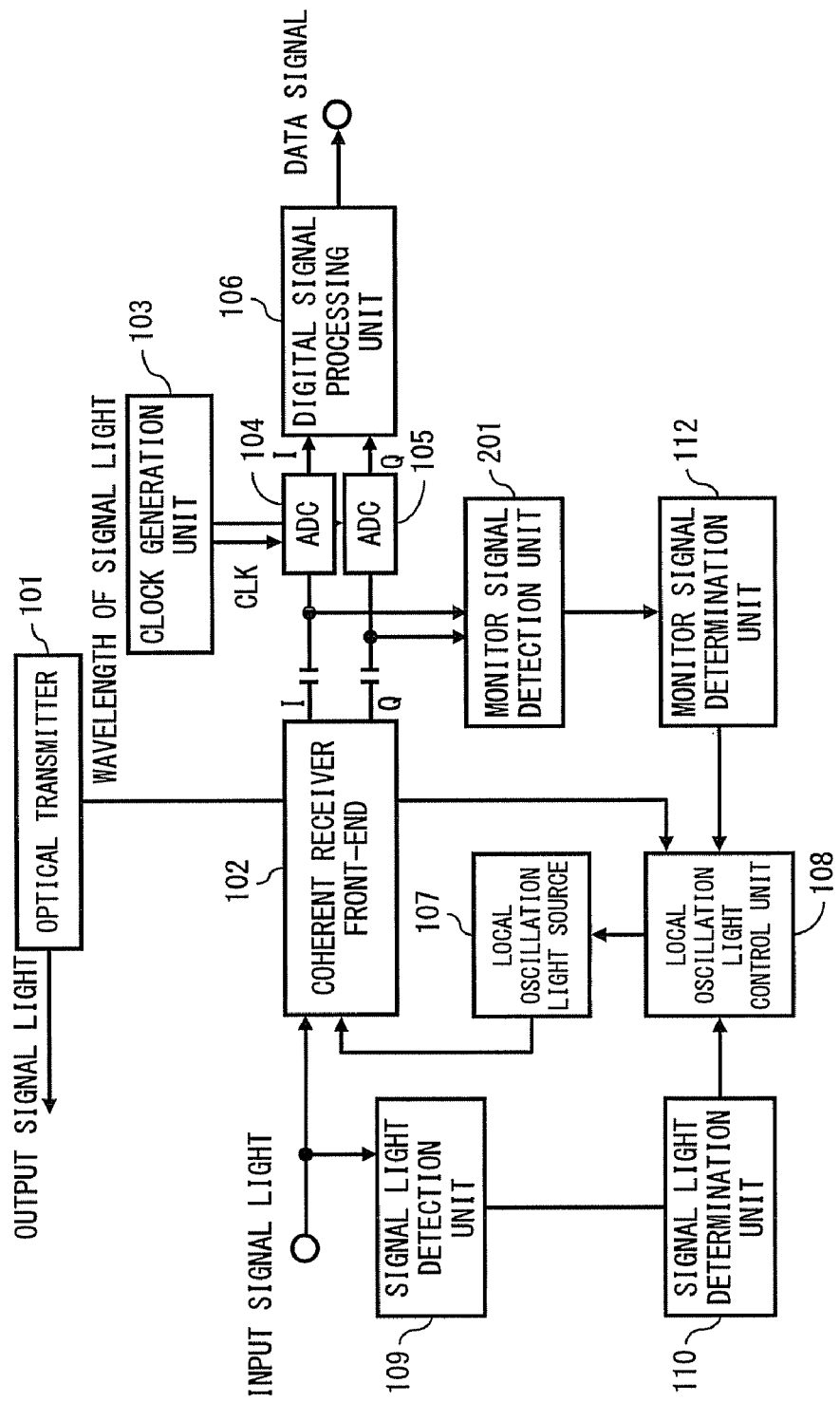
FIG. 2 is a configuration diagram of the second single-polarization digital coherent optical receiver.

The conventional wavelength control method of local oscillation light as mentioned above has the following problem.

As mentioned above, an intradyne system is typically employed in a digital coherent optical receiver, and it is necessary that the frequencies of the received signal light and the local oscillation light be generally consistent with each other. The difference between frequencies is preferably within a few GHz.

The wavelength of signal light to be received may be known or unknown. When the wavelength of signal light is switched in the starting of an optical transmitter and receiver, it is necessary to immediately conform the wavelength of local oscillation light to the wavelength of signal light.

In the conventional automatic starting method of the heterodyne optical receiver, an electric current or a temperature applied to LD is simply increased or decreased, and the wavelength is swept from a shorter wavelength to a longer wavelength or vice versa, wherein the wavelength variable range is about a few nm.

In contrast, the wavelength variable range of the current LD is wider than that, and it may cover the entire range of the C-band, for example. There are various types of constructions of the current LD that can achieve such a wide wavelength variable range. Depending on the construction of the LD, it is not necessarily the minimum time control to sweep the wavelength simply from a shorter wavelength to a longer wavelength, or vice versa.

Further, this problem occurs not only in a digital coherent optical receiver, but also in other optical receivers which decode the received signal by mixing the signal light and the local oscillation light.

Preferred embodiments of the present invention will be explained with reference to accompanying drawings.

An optical receiver according to an embodiment holds information of the parameter control sequence inside or outside the control unit which controls a local oscillation light source, such that the entire wavelength variable range of local oscillation light can be swept in the minimum time depending on the construction of LD. A prompt wavelength sweep may be achieved by altering the wavelength setting parameters of the local oscillation light source according to this parameter control sequence.

As a wavelength setting parameter of the local oscillation light source, an electric current, a temperature, or a selection signal to select one of the plurality of LDs may be used.

FIG. 1 illustrates the first configuration example of a single-polarization digital coherent optical receiver. The optical receiver in FIG. 1 is provided within an optical communication device along with an optical transmitter 101, and includes a coherent receiver front-end 102, a clock generation unit 103, analog/digital converters (ADCS) 104 and 105, a digital signal processing unit 106, and a local oscillation light source 107.

The coherent receiver front-end 102 performs coherent reception of the signal light. Specifically, the signal light input from a transmission line is mixed with the local oscillation light output from the local oscillation light source 107, and two phase components perpendicular to each other are extracted. Then these phase components are converted into electric signals by photoelectric conversion, and an in-phase signal I and a quadrature signal Q are output to ADCs 104 and 105, respectively. DC components of the in-phase signal I and the quadrature signal Q are cut by alternating current (AC) coupling.

ADCs 104 and 105 sample the in-phase signal I and the quadrature signal Q in synchronization with a sampling clock signal CLK output from the clock generation unit 103, and output the digitized in-phase signal I and quadrature signal Q to the digital signal processing unit 106, respectively. The digital signal processing unit 106 performs signal processing such as waveform equalization for distortion compensation and decoding using the in-phase signal I and the quadrature signal Q output from ADCs 104 and 105, and outputs a data signal.

The optical receiver in FIG. 1 further includes a local oscillation light control unit 108, a signal light detection unit 109, a signal light determination unit 110, a monitor signal detection unit 111, and a monitor signal determination unit 112. The signal light detection unit 109 detects the signal light input to the coherent receiver front-end 102, and the signal light determination unit 110 determines the level of the detected signal light. At this time, the signal light detection unit 109 converts the signal light into an electric signal by photoelectric conversion and outputs the electric signal to the signal light determination unit 110.

The monitor signal detection unit 111 detects the in-phase signal I and the quadrature signal Q output from ADCs 104 and 105 as a monitor signal, and the monitor signal determination unit 112 determines the level of the detected monitor signal.

The local oscillation light control unit 108 holds, in the form of a table or list structure for example, a parameter control sequence that can sweep the wavelength variable range of the local oscillation light source 107 in the minimum amount of time. Further, using the wavelength of transmission signal light output from the light transmitter 101 and the determination result output from the signal light determination unit 110 and the monitor signal determination unit 112, the wavelength of the local oscillation light source 107 is swept according to the parameter control sequence.

FIG. 2 illustrates the second configuration example of a single-polarization digital coherent optical receiver. The optical receiver in FIG. 2 has a configuration wherein the monitor signal detection unit 111 of the optical receiver in FIG. 1 is substituted with the monitor signal detection unit 201. Instead of the signals output from ADCs 104 and 105, the monitor signal detection unit 201 detects the in-phase signal I and the quadrature signal Q input to ADCs 104 and 105 as a monitor signal.

Figure 3:
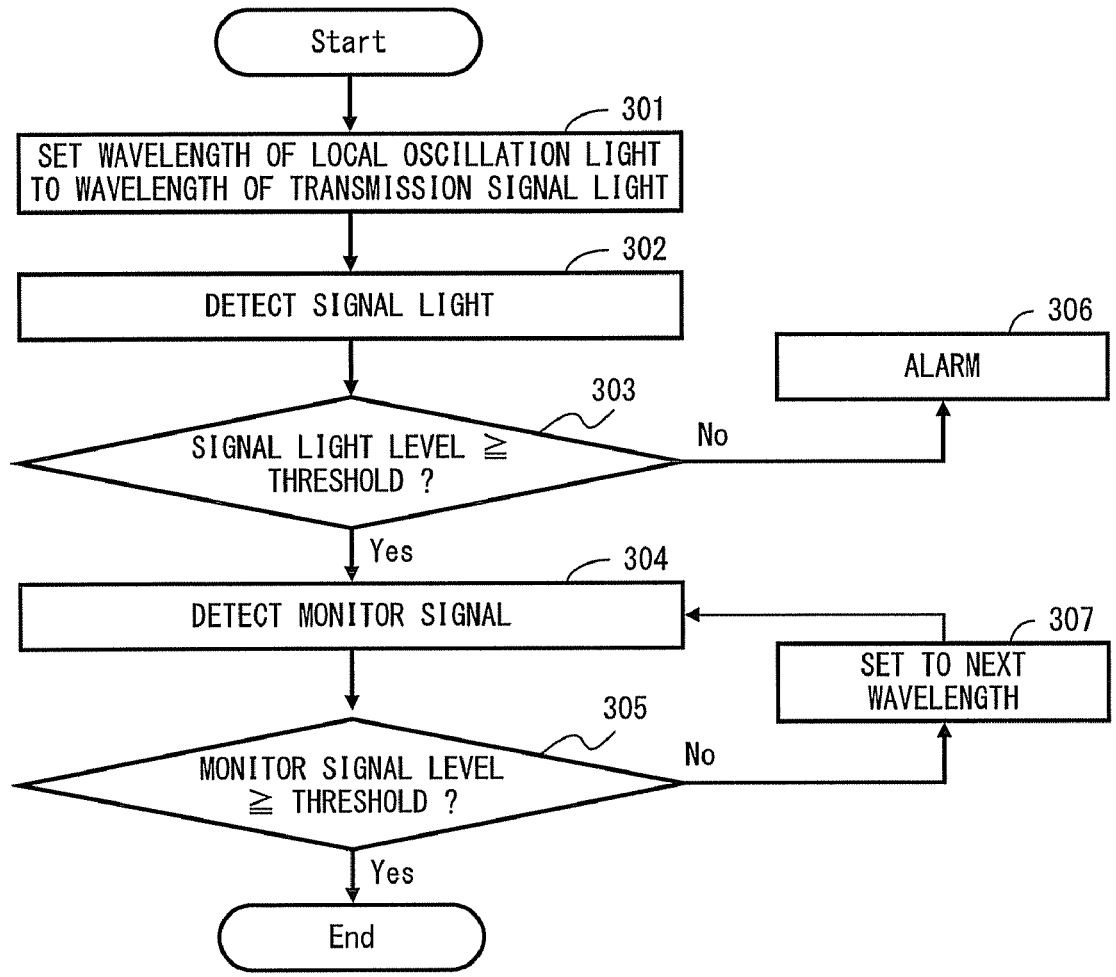
FIG. 3 is a flowchart of the first wavelength control.

FIG. 3 is a flowchart illustrating an example of the wavelength control in the optical receiver in FIG. 1. A similar control goes for the wavelength control in the optical receiver in FIG. 2.

First, the local oscillation light control unit 108 sets the wavelength of local oscillation light to an initial value (step 301). In this example, the wavelength of transmission signal light output from the optical transmitter 101 is used as the initial value. Then the optical receiver performs coherent reception of the signal light using local oscillation light having a set wavelength.

Subsequently, the signal light detection unit 109 detects the signal light input to the coherent receiver front-end 102 (step 302), and the signal light determination unit 110 compares the signal light level with a threshold (step 303). If the signal light level is lower than the threshold (step 303, No), the local oscillation light control unit 108 performs alarm processing.

In contrast, if the signal light level is higher than or equal to the threshold (step 303, Yes), the monitor signal detection unit 111 detects the monitor signal output from ADCs 104 and 105 (step 304). Then the monitor signal determination unit 112 compares the monitor signal level with a threshold (step 305).

In step 305, a value reflecting at least one of the in-phase signal I and the quadrature signal Q is used as a monitor signal level. For example, the level of either the in-phase signal I or the quadrature signal Q may be used, and the power of the in-phase signal I and the quadrature signal Q, or the square root thereof may be used.

If the monitor signal level is lower than the threshold (step 305, No), the local oscillation light control unit 108 alters the wavelength setting parameter of the local oscillation light source 107 according to the parameter control sequence, and sets the wavelength of local oscillation light to the next wavelength (step 307). Then the optical receiver repeats the controls in step 304 and after, and once the monitor signal level gets higher than or equal to the threshold (step 305, Yes), the wavelength control is terminated.

According to such a wavelength control, upon confirming that the signal light is input to the coherent receiver front-end 102, the presence or absence of the monitor signal is monitored while altering the wavelength of local oscillation light according to the parameter control sequence in the minimum time. Then, once the wavelength of local oscillation light is generally consistent with the wavelength of signal light so that the monitor signal is detected, the wavelength sweep of the local oscillation light is terminated. Therefore, the optical receiver can start coherent reception of the signal light immediately.

Further, if the wavelength of transmission signal light output from the optical transmitter 101 is used as the initial value, the need for altering the wavelength of local oscillation light is eliminated when the wavelength of the received signal light is consistent with the wavelength of transmission signal light. In this case, the optical receiver can start coherent reception immediately.

Figure 4:
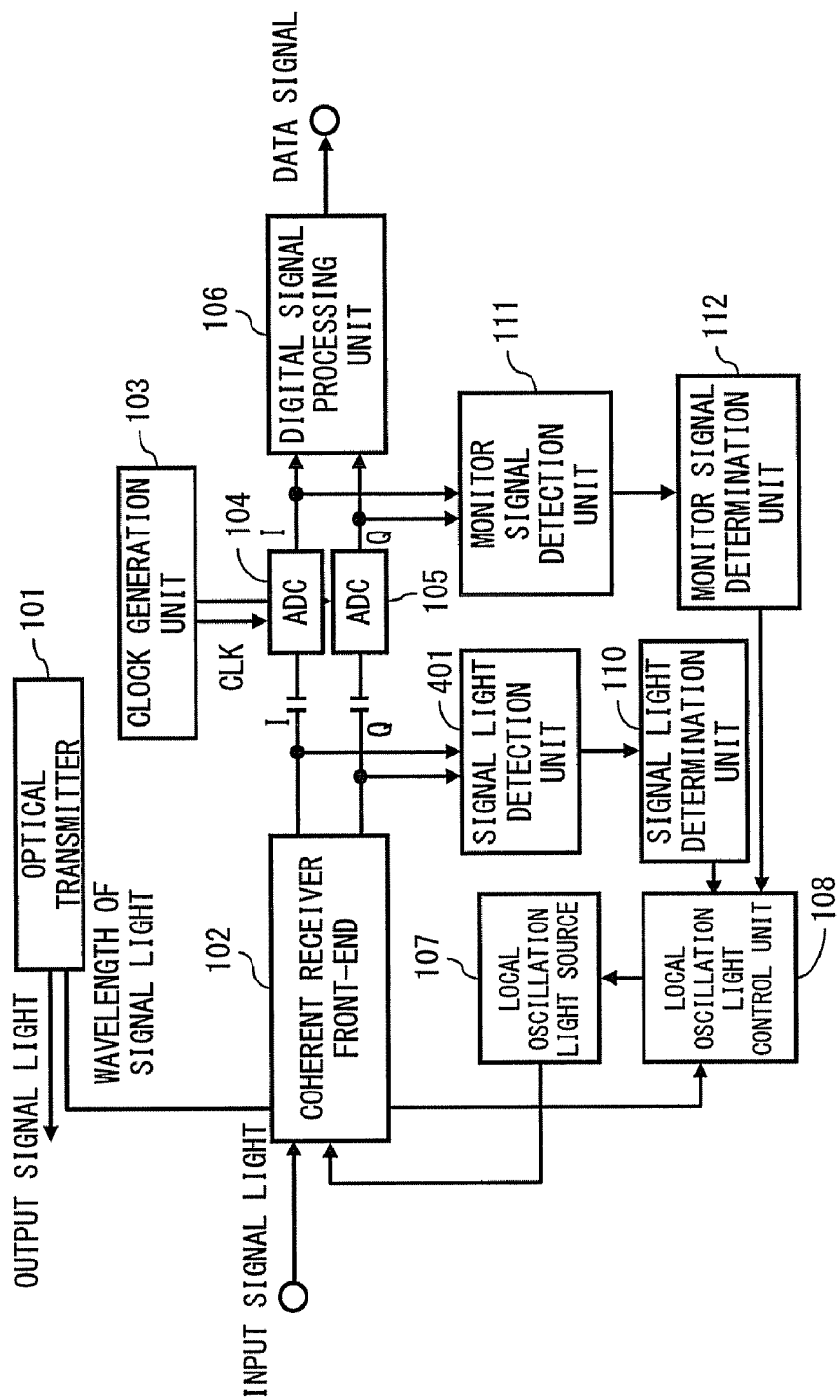
FIG. 4 is a configuration diagram of the third single-polarization digital coherent optical receiver.

FIG. 4 illustrates the third configuration example of a single-polarization digital coherent optical receiver. The optical receiver in FIG. 4 has a configuration wherein the signal light detection unit 109 of the optical receiver in FIG. 1 is substituted with the signal light detection unit 401. Instead of the signal light input to the coherent receiver front-end 102, the signal light detection unit 401 detects the in-phase signal I and the quadrature signal Q output from the coherent receiver front-end 102.

Figure 5:
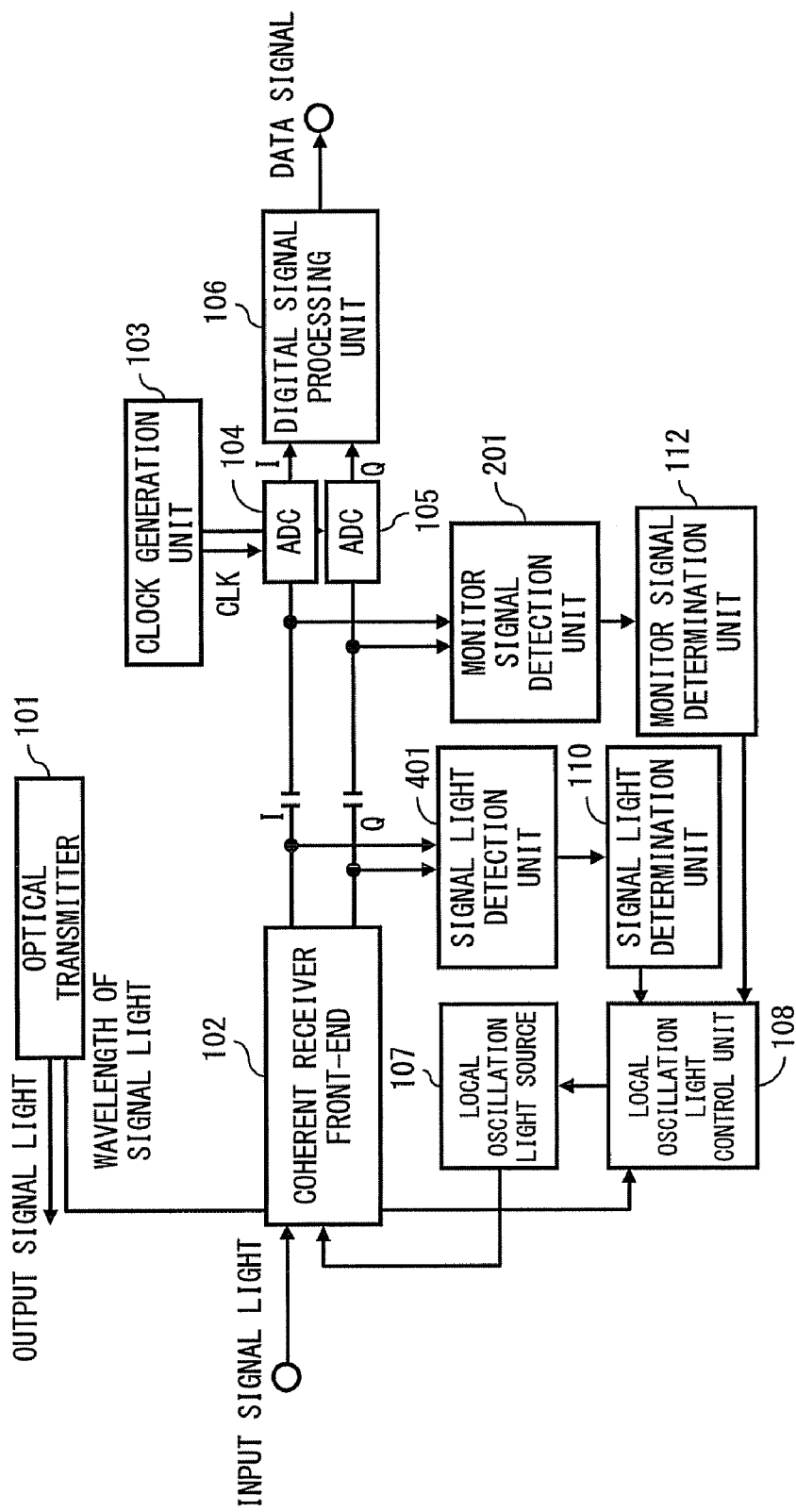
FIG. 5 is a configuration diagram of the fourth single-polarization digital coherent optical receiver.

FIG. 5 illustrates the fourth configuration example of a single-polarization digital coherent optical receiver. The optical receiver in FIG. 5 has a configuration wherein the signal light detection unit 109 of the optical receiver in FIG. 2 is substituted with the signal light detection unit 401.

FIG. 6 is a flowchart illustrating an example of the wavelength control in the optical receiver in FIG. 4. A similar control goes for the wavelength control in the optical receiver in FIG. 5.

The controls in steps 601 and 606-609 in FIG. 6 are similar to the controls in steps 301 and 304-307 in FIG. 3.

When the wavelength of local oscillation light is set to the initial value in step 601, the local oscillation light control unit 108 terminates outputting the local oscillation light (step 602) so that only the signal light is input to the coherent receiver front-end 102.

Subsequently, the signal light detection unit 401 detects the in-phase signal I and the quadrature signal Q output from the coherent receiver front-end 102 (step 603), and the signal light determination unit 110 compares the detected signal level with a threshold (step 604).

In step 604, a value reflecting at least one of the in-phase signal I and the quadrature signal Q is used as a signal level. For example, the level of either the in-phase signal I or the quadrature signal Q may be used, and the power of the in-phase signal I and the quadrature signal Q, or the square root thereof may be used.

If the signal level is lower than the threshold (step 604, No), the local oscillation light control unit 108 performs an alarm processing.

In contrast, if the signal level is higher than or equal to the threshold (step 604, Yes), outputting the local oscillation light is resumed (step 605) so that the local oscillation light is input to the coherent receiver front-end 102. Then the controls in step 606 and after are performed.

While in the optical receivers in FIGS. 1, 2, 4, and 5, the parameter control sequence is held within the local oscillation light control unit 108, this information may be held outside the local oscillation light control unit 108.

FIG. 7 illustrates an example of wavelength setting parameters of the local oscillation light source 107. In this example, the wavelength of the local oscillation light source 107 is controlled using two parameters of a temperature and an applied electric current to obtain the wide wavelength variable range.

In order to sweep the wavelength in the minimum time, it is preferable to consider the loop relationship between the control with the longer switching time and the control with the shorter switching time. In the example of FIG. 7, the switching time of the temperature regulation and the current regulation is 1 second and 10 ms respectively, and the number of switching steps of the temperature regulation and the current regulation are both 5 steps. In this case, the following 2 sequences of parameter control may be considered.

(a) Altering the temperature in the outer control loop, and altering the current in the inner control loop.

In this case, the current is swept in each set temperature, and thus the time required to sweep all combinations of the temperature and the current is calculated as the following formula.

$$10(ms) \times 5 \times 5 + 4 \times 1(s) = 4.25(s)$$

(b) Altering the current in the outer control loop, and altering the temperature in the inner control loop.

In this case, the temperature is swept in each set current value, thus the time required to sweep all combinations of the temperature and the current is calculated as the following formula.

$$1(s) \times 5 \times 5 + 4 \times 10(ms) = 25.04(s)$$

Consequently, the parameter control sequence in which the wavelength can be swept in the minimum time is (a).

Further, the case wherein the selection signal selecting one of the plurality of LDs is added as another wavelength setting parameter is also considered. In general, when a plurality of wavelength variable parameters are used, it is preferable to compare the sweep time of each parameter and to alter the parameter having the shortest sweep time in the innermost control loop and to alter the parameter in more outer control loop as its sweep time gets longer. The wavelength variable range can be swept in the minimum time by specifying each control loop for each of the plurality of wavelength setting parameters according to this parameter control sequence.

Figure 9:
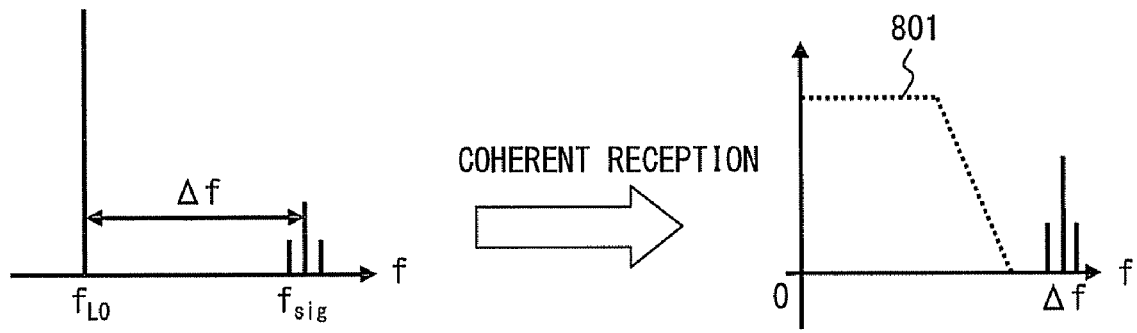
FIG. 9 is a diagram illustrating the case wherein the frequency of signal light is far away from the frequency of local oscillation light.

FIGS. 8 and 9 illustrate a relationship between the frequency of the local oscillation light and the monitor signal. As illustrated in FIG. 8, when the frequency of signal light $f_{sig}$ is generally consistent with the frequency of local oscillation light $f_{LO}$, the difference $\Delta f (= |f_{LO} - f_{sig}|)$ between $f_{sig}$ and $f_{LO}$ is small.

The frequency of an electric signal after coherent reception is consistent with $\Delta f$, and this electric signal is typically output through a low-pass filter such as an antialiasing filter. Therefore, if the frequency $\Delta f$ is within the pass band 801 of the low-pass filter, some sort of monitor signal 802 will be detected.

On the other hand, as illustrated in FIG. 9, if the frequency of signal light $f_{sig}$ is far away from the frequency of local oscillation light $f_{LO}$, $\Delta f$ is large. In this case, since the frequency of an electric signal after coherent reception $\Delta f$ is outside the pass band 801 of the low-pass filter, the monitor signal will not be detected.

Consider the case wherein the frequency of the local oscillation light is swept at intervals of 50 GHz, for example. If an integratable tunable laser assembly (ITLA)-compliant LD is used, then when $f_{sig}$ and $f_{Lo}$ are consistent with each other in units of 50 GHz intervals, the difference $\Delta f$ between frequencies is up to 5 GHz. In this case, some sort of monitor signal can be obtained after coherent reception.

In contrast, if $f_{sig}$ and $f_{Lo}$ are not consistent with each other, a beat light of at least 40 GHz enters a photoelectric converter. This beat light is eliminated by the photoelectric converter or the low-pass filter in the coherent receiver front-end 102, and thus the monitor signal may not be obtained.

Consequently, it can be determined whether or not the frequency (wavelength) of signal light and the frequency (wavelength) of local oscillation light are consistent with each other by monitoring the electric signal after coherent reception.

Next, consider the relationship between the frequencies of the local oscillation light, the signal light, and the monitor signal when the received signal light is a wavelength-division multiplexing (WDM) light signal. If the frequency variable range of the local oscillation light is very wide, then given that the frequency interval of the WDM signal is $f_{WDM}$ and the signal symbol rate is B, the monitor signal frequency $\Delta f$ needs to meet the following requirement.

$$\Delta f < f_{WDM}/2 \text{ and } \Delta f < B$$

However, if the signal symbol rate and the signal spectrum are not consistent with each other such as in the case using code division multiplexing, it is not necessary to meet this requirement.

Next, an embodiment for avoiding malfunction of the aforementioned wavelength control is described.

FIG. 10 illustrates the first example of a malfunction. In FIG. 10, the frequency setting sequence in a wavelength sweep is to be in the order of f1, f2, and f3 (f1<f3<f2). When the wavelength is swept from f1 to f2, a monitor signal is detected upon passing in the vicinity of $f_{sig}$ with the local oscillation light source 107 left in an ON state. However, since the target value is set to f2, the wavelength sweep is terminated at f2. In this case, since the correct frequency for the coherent reception is f3, it results in malfunction.

Figure 11:
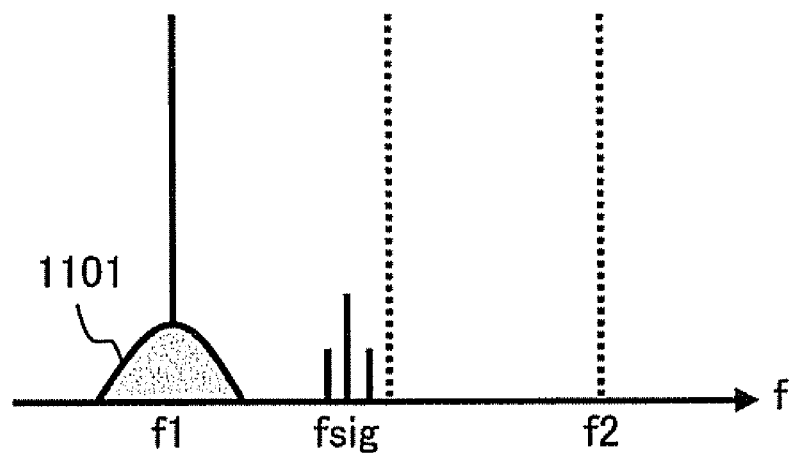
FIG. 11 is a diagram of the second malfunction.

FIG. 11 illustrates the second example of a malfunction. If the level of amplified spontaneous emission (ASE) component 1101 in a different frequency from $f_{sig}$ is high, then the monitor signal derived from the interference between the signal light and ASE component 1101 may exceed the threshold of the monitor signal. In this case, the frequency of the local oscillation light source 107 is not set correctly, which results in malfunction.

Therefore, in order to avoid these malfunctions, the following method of preventing malfunction may be employed.

(1) A wait time in which the threshold determination is not performed is provided with the monitor signal determination unit 112. As the wait time, a period of time longer than or equal to the time required for a single wavelength switching may be set, for example. Thereby the threshold determination is prevented from being performed during the wavelength sweep from f1 to f2 in FIG. 10, and the wavelength sweep does not terminate at f2.

(2) It is determined whether or not the data signal is decoded correctly using decode information such as an alarm signal from the optical transport network (OTN) framer provided in the subsequent stage after the digital signal processing unit 106, or from the signal quality monitor provided in the digital signal processing unit 106. And if the data signal is not decoded correctly, a wavelength sweep is started again. Thereby malfunctions such as those in FIGS. 10 and 11 are prevented.

Either one or both of the methods of preventing malfunction (1) and (2) may be used.

Figure 12:
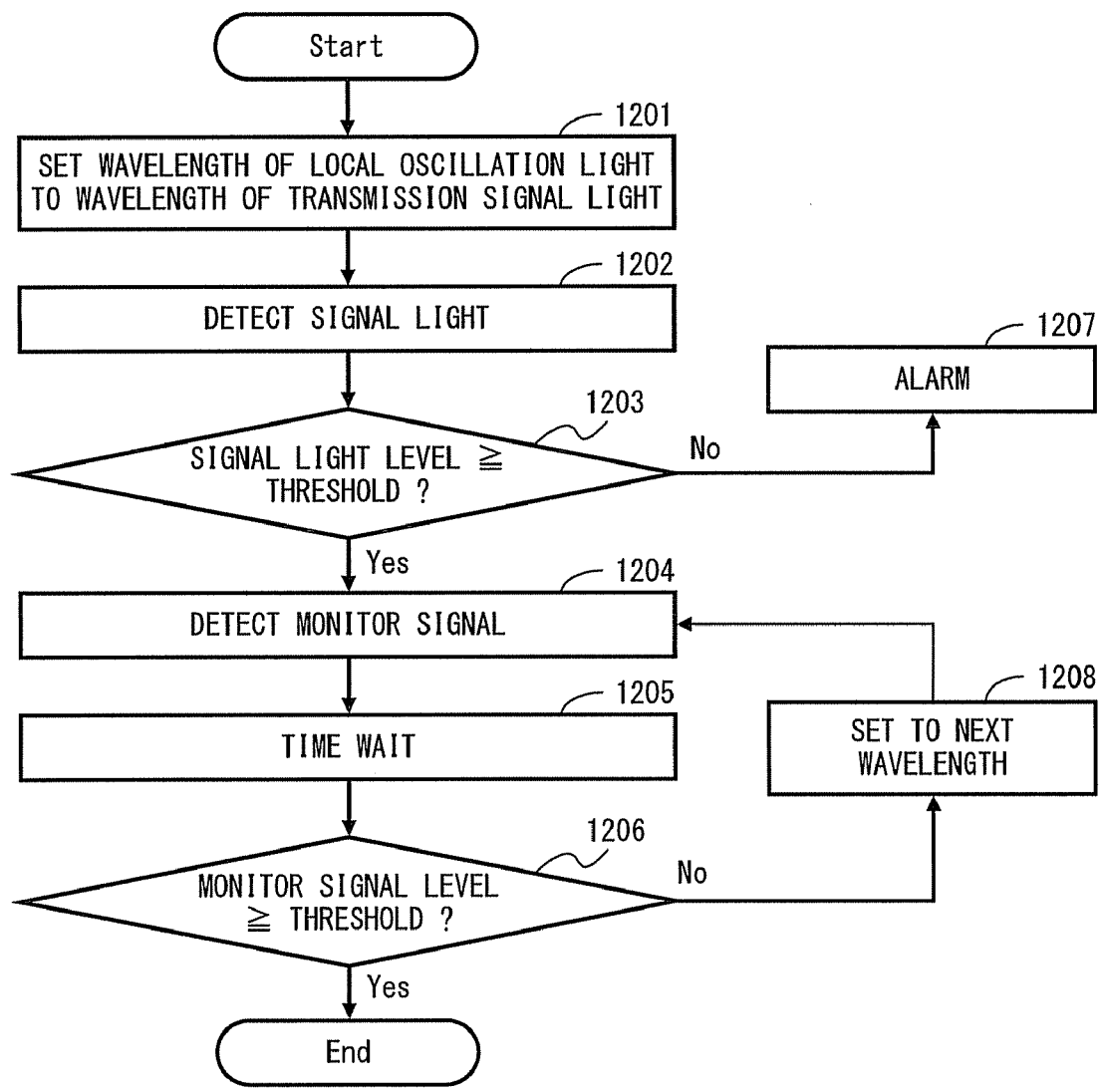
FIG. 12 is a flowchart of wavelength control applying the first method of preventing malfunction.

FIG. 12 is a flowchart illustrating an example wherein the method of preventing malfunction (1) is applied to the wavelength control in FIG. 3.

The controls in steps 1201-1204 and 1206-1208 in FIG. 12 are similar to the controls in steps 301-304 and 305-307 in FIG. 3.

When the monitor signal is detected in step 1204, the monitor signal determination unit 112 waits for the elapse of a certain period of time (step 1205), and then compares the monitor signal level with a threshold (1206).

In the case of applying the method of preventing malfunction (1) to the wavelength control in FIG. 6, a time wait similar to that in step 1205 may be performed between steps 606 and 607.

FIG. 13 is a flowchart illustrating an example wherein the method of preventing malfunction (2) is applied to the wavelength control in FIG. 3.

The controls in steps 1301-1307 in FIG. 13 are similar to the controls in steps 301-307 in FIG. 3.

If the monitor signal level is higher than or equal to the threshold in step 1305 (step 1305, Yes), then the local oscillation light control unit 108 determines whether or not the signal is decoded correctly using the decode information from the OTN framer or the signal quality monitor (step 1308).

As the decode information, statistics such as an average and a variance of the decoded signals, a bit error rate (BER), or an optical signal-to-noise ratio (OSNR) is used, for example. A determination value which determines the right or wrong of the decoded result based on the statistics, BER, or OSNR, etc. may also be used as the decode information.

If the signal is not decoded correctly (step 1308, No), then the controls in step 1308 and after are repeated, and if the signal is decoded correctly (step 1308, Yes), then the wavelength control is terminated.

In the case wherein the method of preventing malfunction (2) is applied to the wavelength control in FIG. 6, a decode determination similar to step 1308 may be performed after step 607.

Figure 14:
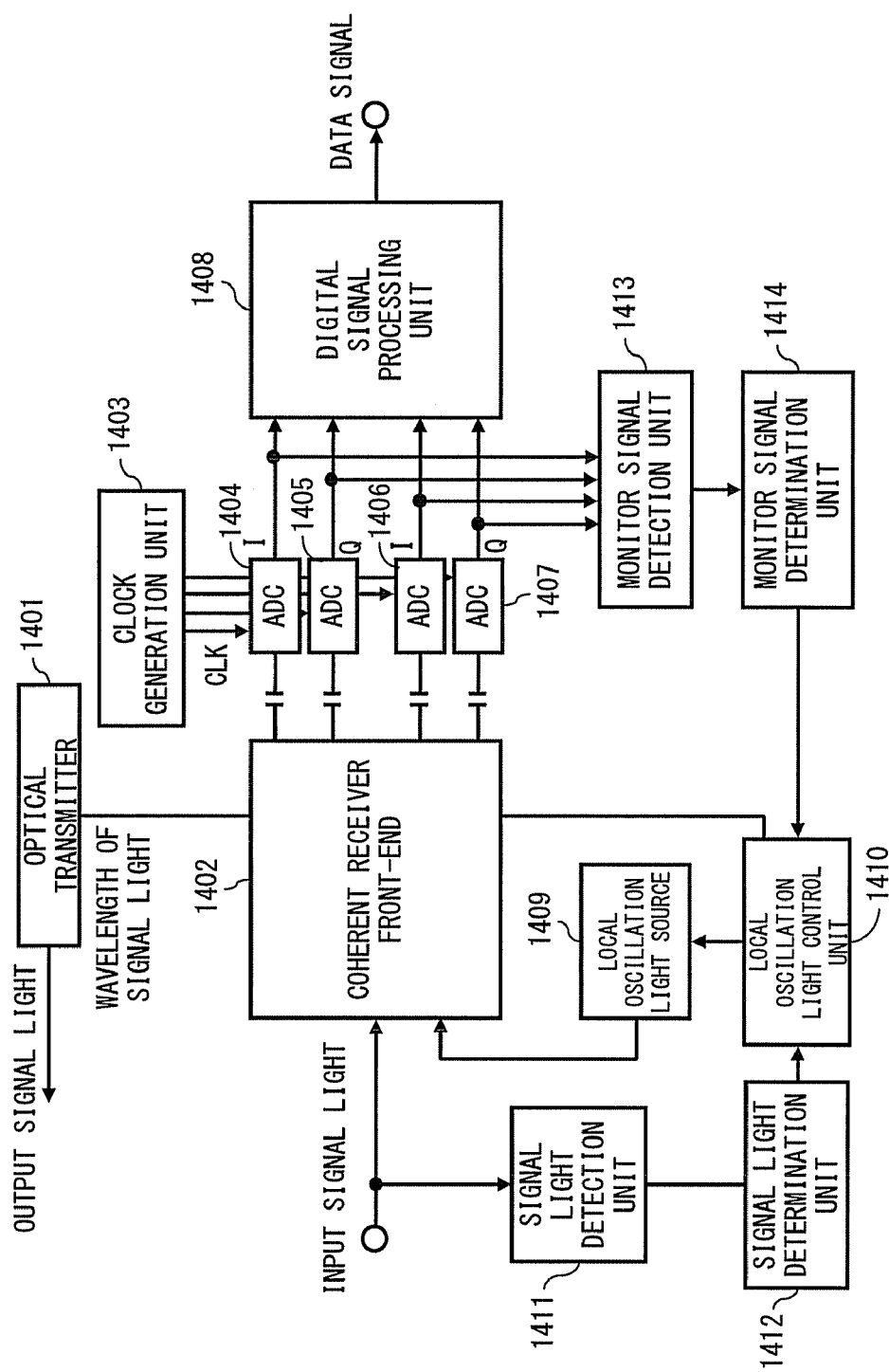
FIG. 14 is a configuration diagram of the first dual-polarization digital coherent optical receiver.

FIG. 14 illustrates the first configuration example of the dual-polarization digital coherent optical receiver. The optical receiver in FIG. 14 is provided within the optical communication device along with the optical transmitter 1401, and includes a coherent receiver front-end 1402, a clock generation unit 1403, ADCs 1404-1407, a digital signal processing unit 1408, and a local oscillation light source 1409.

A signal light and a local oscillation light including two polarization components are input into the coherent receiver front-end 1402, and coherent reception of the signal light is performed. At this time, the coherent receiver front-end 1402 mixes the signal light input from the transmission line and the local oscillation light output from the local oscillation light source 1409 for each of the two polarization, and extracts two phase components perpendicular to each other. Then those phase components are converted into electric signals by photoelectric conversion, and the in-phase signal I and the quadrature signal Q are output.

The in-phase signal I and the quadrature signal Q derived from one of the polarizations are output to ADCs 1404 and 1405 respectively, and the in-phase signal I and the quadrature signal Q derived from another one of the polarizations are output to ADCs 1406 ad 1407 respectively. DC components of the in-phase signal I and the quadrature signal Q are cut by AC coupling.

Each of ADCs 1404-1407 is synchronized with the sampling clock signal CLK output from the clock generation unit 1403, samples the in-phase signal I or the quadrature signal Q, and outputs the digitized in-phase signal I or quadrature signal Q to the digital processing unit 1408. The digital signal processing unit 1408 performs signal processing such as waveform equalization for distortion compensation and decoding by using the in-phase signal I and the quadrature signal Q output from ADCs 1404-1407, and outputs the data signal.

The optical receiver in FIG. 14 further includes a local oscillation light control unit 1410, a signal light detection unit 1411, a signal light determination unit 1412, a monitor signal detection unit 1413, and a monitor signal determination unit 1414. The signal light detection unit 1411 detects a signal light input to the coherent receiver front-end 1402, and the signal light determination unit 1412 determines the level of the detected signal light.

The monitor signal detection unit 1413 detects the in-phase signal I and the quadrature signal Q output from ADCs 1404-1407 as a monitor signal, and the monitor signal determination unit 1414 determines the level of the detected monitor signal.

The local oscillation light control unit 1410 holds a parameter control sequence, which can sweep the wavelength variable range of the local oscillation light source 1409 in the minimum time, in the form of a table and list structure, for example. Further, using the wavelength of a transmission signal light output from the light transmitter 1401 and the determination result output from the signal light determination unit 1412 and the monitor signal determination unit 1414, the wavelength of the local oscillation light source 1409 is swept according to the parameter control sequence.

Figure 15:
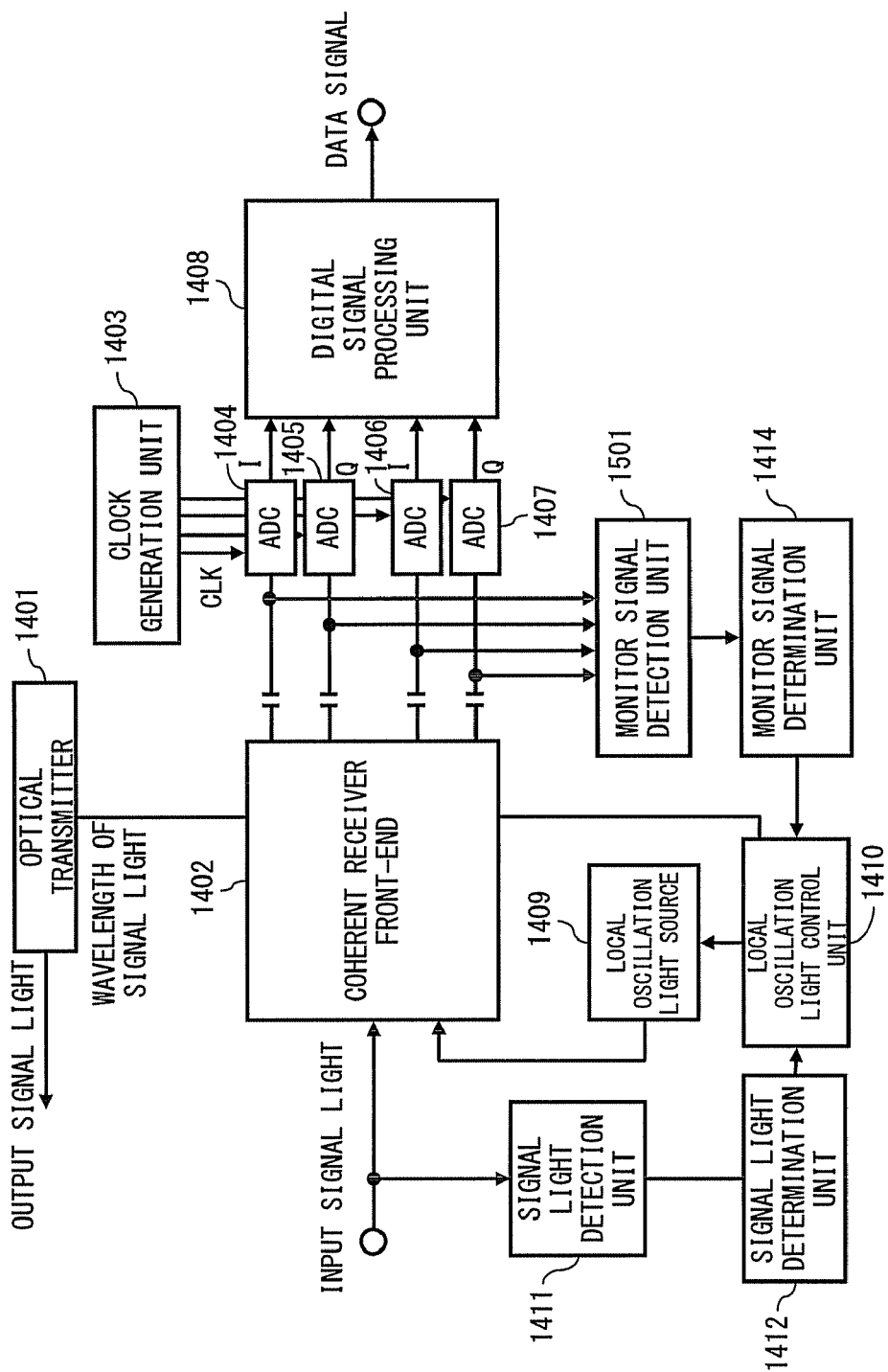
FIG. 15 is a configuration diagram of the second dual-polarization digital coherent optical receiver.

FIG. 15 illustrates the second configuration example of the dual-polarization digital coherent optical receiver. The optical receiver in FIG. 15 has a configuration wherein the monitor signal detection unit 1413 in the optical receiver in FIG. 14 is substituted with a monitor signal detection unit 1501. Instead of the signals output from ADCs 1404-1407, the monitor signal detection unit 1501 detects in-phase signal I and quadrature signal Q input to ADCs 1404-1407 as a monitor signal.

In the optical receivers in FIGS. 14 and 15, the wavelength control illustrated in FIG. 3, for example, is performed. The wavelength controls illustrated in FIGS. 12 and 13 may also be performed.

FIG. 16 illustrates the third configuration example of the dual-polarization digital coherent optical receiver. The optical receiver in FIG. 16 has a configuration wherein the signal light detection unit 1411 of the optical receiver in FIG. 14 is substituted with the signal light detection unit 1601. Instead of the signal light input into the coherent receiver front-end 1402, the signal light detection unit 1601 detects the in-phase signal I and the quadrature signal Q output from the coherent receiver front-end 1402.

Figure 17:
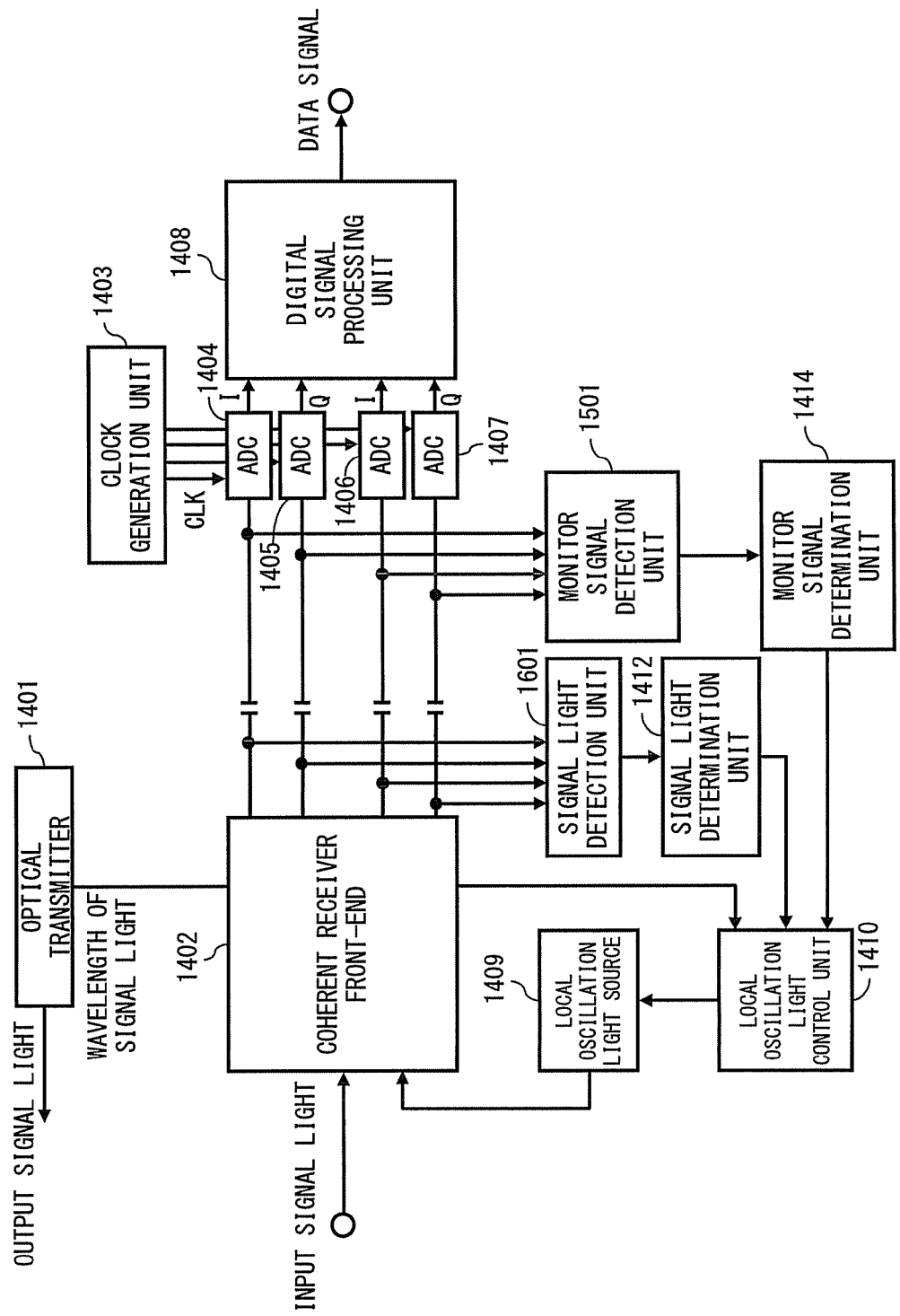
FIG. 17 is a configuration diagram of the fourth dual-polarization digital coherent optical receiver.

FIG. 17 illustrates the fourth configuration example of the dual-polarization digital coherent optical receiver. The optical receiver in FIG. 17 has a configuration wherein the signal light detection unit 1411 of the optical receiver in FIG. 15 is substituted with the signal light detection unit 1601.

In the optical receivers in FIGS. 15 and 17, the wavelength control illustrated in FIG. 6, for example, is performed. The wavelength controls illustrated in FIGS. 12 and 13 may also be performed.

While in the optical receivers in FIGS. 14-17, the parameter control sequence is held within the local oscillation light control unit 1410, this information may be held outside the local oscillation light control unit 1410.

Each of the wavelength control methods described above can be applied not only to the single-polarization digital coherent optical receiver and the dual-polarization digital coherent optical receiver, but also to other optical receivers which decode the received signal by mixing the signal light and the local oscillation light.

According to the optical receiver or the local oscillation light source device of the embodiments, altering a plurality of wavelength setting parameters according to the set parameter control sequence can reduce the time required for a wavelength sweep compared to the case in which the wavelength is swept simply from a shorter wavelength to a longer wavelength or vice versa.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
a local oscillation light source configured to output a local oscillation light having a wavelength determined on the basis of a plurality of wavelength setting parameters;
a receiving device configured to generate an electric signal by photoelectric conversion from a light obtained by mixing a received signal light and the local oscillation light;
a signal processing device configured to decode a received signal on the basis of the electric signal;
a signal determination device configured to determine whether or not the electric signal is output from the receiving device; and
a local oscillation light control device configured to control the wavelength of the local oscillation light output from the local oscillation light source by altering the plurality of wavelength setting parameters according to a parameter control sequence determined for the plurality of wavelength setting parameters, to terminate wavelength control of the local oscillation light when the electric signal is output from the receiving device and the received signal is decoded correctly by the signal processing device, and to continue the wavelength control of the local oscillation light when the electric signal is output from the receiving device and the received signal is not decoded correctly by the signal processing device.

2. The optical receiver according to claim 1, wherein the parameter control sequence is a sequence which can sweep a wavelength variable range of the local oscillation light source in a minimum time.

3. The optical receiver according to claim 1, wherein the plurality of wavelength setting parameters is a temperature and an electric current of the local oscillation light source, and the parameter control sequence is a sequence to indicate altering the temperature in an outer control loop and altering the electric current in an inner control loop.

4. The optical receiver according to claim 1, wherein the signal determination device determines whether or not the electric signal is output from the receiving device after an elapse of a certain period of time after the electric signal is output from the receiving device.

5. The optical receiver according to claim 1, wherein the parameter control sequence is a sequence to specify a control loop of each of the plurality of wavelength setting parameters and to indicate altering a parameter having a shortest sweep time in a innermost control loop and altering a parameter having a longer sweep time in a more outer control loop.

6. The optical receiver according to claim 1, further comprising a signal light determination device configured to determine whether or not the signal light is input to the receiving device, wherein the local oscillation light control device performs the wavelength control of the local oscillation light when it is determined that the signal light is input to the receiving device.

7. The optical receiver according to claim 1, wherein the receiving device extracts two phase components perpendicular to each other from the light obtained by mixing the signal light and the local oscillation light, and generates an in-phase signal and a quadrature signal by photoelectric conversion from the two extracted phase components, and the signal determination device determines whether or not at least one of the in-phase signal and the quadrature signal is output from the receiving device.

8. The optical receiver according to claim 1, wherein the receiving device extracts two phase components perpendicular to each other from the light obtained by mixing a signal light including first and second polarization and a local oscillation light including the first and second polarization for each polarization, and generates a first in-phase signal and a first quadrature signal by photoelectric conversion from the two extracted phase components by mixing the signal light and the local oscillation light for the first polarization, and generates a second in-phase signal and a second quadrature signal by photoelectric conversion from the two extracted phase components by mixing the signal light and the local oscillation light for the second polarization, and the signal determination device determines whether or not at least one of the first in-phase signal, the first quadrature signal, the second in-phase signal, and the second quadrature signal is output from the receiving device.

9. An local oscillation light source device comprising:
a local oscillation light source configured to output a local oscillation light having a wavelength determined on the basis of a plurality of wavelength setting parameters; and
a local oscillation light control device configured to control the wavelength of the local oscillation light output from the local oscillation light source by altering the plurality of wavelength setting parameters according to a parameter control sequence determined for the plurality of wavelength setting parameters, to terminate wavelength control of the local oscillation light when it is determined that an electric signal is generated by photoelectric conversion from a light obtained by mixing a received signal light and the local oscillation light and a received signal is decoded correctly on the basis of the electric signal, and to continue the wavelength control of the local oscillation light when it is determined that an electric signal is generated by photoelectric conversion from a light obtained by mixing a received signal light and a received signal is not decoded correctly on the basis of the electric signal.

10. A local oscillation light control method comprising:

generating a local oscillation light having a wavelength determined on the basis of a plurality of wavelength setting parameters;

receiving a signal light;

generating an electric signal by photoelectric conversion from a light obtained by mixing a received signal light and the local oscillation light;

controlling the wavelength of the local oscillation light output from the local oscillation light source by altering the plurality of wavelength setting parameters according to a parameter control sequence determined for the plurality of wavelength setting parameters;

determining whether or not the electric signal is generated;

terminating wavelength control of the local oscillation light when it is determined that the electric signal is generated and a received signal is decoded correctly on the basis of the electric signal; and continuing the wavelength control of the local oscillation light when it is determined that the electric signal is generated and a received signal is not decoded correctly on the basis of the electric signal.

* * * * *